US010336261B2

(12) United States Patent
White et al.

(10) Patent No.: US 10,336,261 B2
(45) Date of Patent: Jul. 2, 2019

(54) SHELVING ARRANGEMENT FOR A VEHICLE

(71) Applicant: FORD GLOBAL TECHNOLOGIES, LLC, Dearborn, MI (US)

(72) Inventors: Kendra White, Redford, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/590,275

(22) Filed: May 9, 2017

(65) Prior Publication Data
US 2018/0326913 A1 Nov. 15, 2018

(51) Int. Cl.
*B60R 5/04* (2006.01)
*B60R 7/02* (2006.01)
*A47B 96/02* (2006.01)
*B60P 9/00* (2006.01)
*B60R 11/00* (2006.01)

(52) U.S. Cl.
CPC .............. *B60R 5/048* (2013.01); *B60R 5/045* (2013.01); *B60R 7/02* (2013.01); *A47B 96/021* (2013.01); *B60P 9/00* (2013.01); *B60R 5/04* (2013.01); *B60R 2011/0024* (2013.01)

(58) Field of Classification Search
CPC ............ B60R 5/048; B60R 9/065; B60R 7/02
USPC ......... 296/24.43, 37.16, 24.44, 542; 224/542
See application file for complete search history.

(56) References Cited

U.S. PATENT DOCUMENTS

| 3,393,936 | A | * | 7/1968 | Hall | B60R 5/045 296/24.44 |
|---|---|---|---|---|---|
| 5,366,124 | A | * | 11/1994 | Dearborn, IV | B60P 7/08 224/404 |
| 6,092,708 | A | * | 7/2000 | Rand | B60R 11/00 108/147.21 |
| 6,386,412 | B1 | * | 5/2002 | Konechne | B60R 7/04 224/275 |
| 6,644,710 | B2 | * | 11/2003 | Seel | B60R 7/02 224/497 |
| 6,733,060 | B1 | * | 5/2004 | Pavkov | B60R 5/04 108/110 |
| 7,758,092 | B2 | * | 7/2010 | Kolpasky | B60R 7/02 296/24.43 |
| 2005/0279793 | A1 | * | 12/2005 | Mulvihill | B60R 7/02 224/542 |
| 2018/0015883 | A1 | * | 1/2018 | Loew | B60R 7/02 |

FOREIGN PATENT DOCUMENTS

DE 102007002822 A1 1/2008

* cited by examiner

*Primary Examiner* — Jason S Morrow
(74) *Attorney, Agent, or Firm* — Vichit Chea; Brooks Kushman, P.C.

(57) ABSTRACT

A vehicle includes a cargo area defined by opposing interior sidewalls, each of the sidewalls having a mount formed therein and a shelving arrangement defining a storage receptacle. The arrangement has a rigid top panel with extendable wings configured to engage the mounts to support and suspend the arrangement within the cargo area. The arrangement further has collapsible walls attached with the top panel such that in an expanded position, the storage receptacle is disposed underneath the panel.

20 Claims, 4 Drawing Sheets

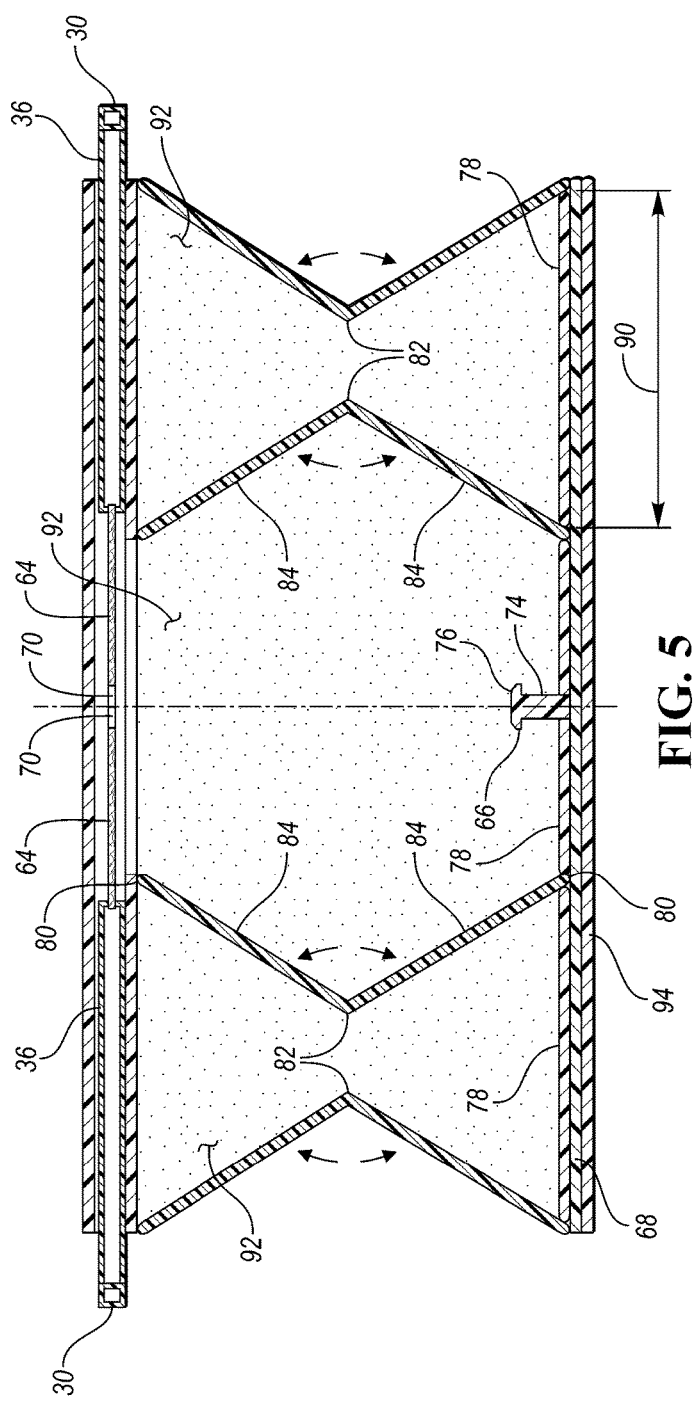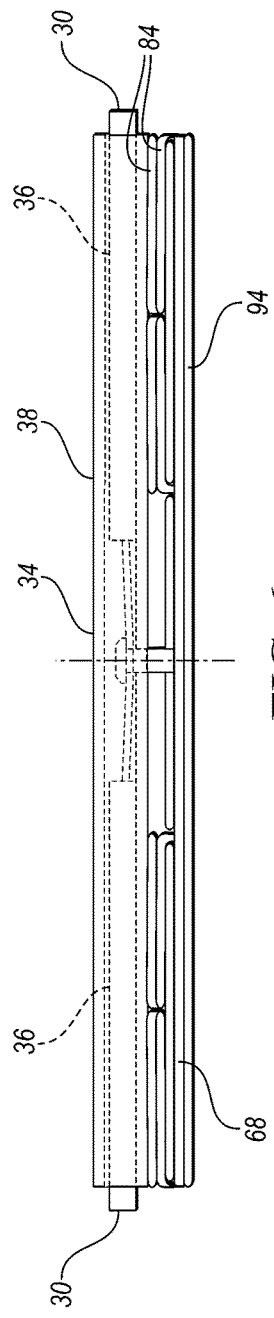

SHELVING ARRANGEMENT FOR A VEHICLE

TECHNICAL FIELD

The present disclosure relates to cargo areas of motor vehicles.

BACKGROUND

Motor vehicles may include a cargo area within the rear of the vehicle. Some vehicles, e.g., three-row SUVs, may have limited cargo space. Shelving arrangements may be used within cargo areas to improve storage capability.

SUMMARY

According to an embodiment, a vehicle includes a cargo area defined by opposing interior sidewalls, each of the sidewalls having a mount formed therein and a shelving arrangement defining a storage receptacle. The arrangement has a rigid top panel with extendable wings configured to engage the mounts to support and suspend the arrangement within the cargo area. The arrangement further has collapsible walls attached with the top panel such that in an expanded position, the storage receptacle is disposed underneath the panel.

According to another embodiment, a shelving arrangement for a vehicle includes a rigid top panel having wings configured to engage with mounts coupled to opposing interior walls of a cargo area of the vehicle to support the panel within the cargo area. The arrangement further includes collapsible walls attached with the top panel such that in an expanded position, the collapsible walls define a storage receptacle disposed on one side of the top panel.

According to another embodiment, a shelving arrangement for a vehicle includes a rigid top panel having a hollowed portion formed in an underside thereof for receiving extendable wings in a collapsed position. The wings are slidably coupled to opposing ends of the panel for engaging with opposing interior sidewalls of the vehicle. The arrangement further includes collapsible walls attached with the top panel such that in an expanded position, a storage receptacle defined by the walls is disposed underneath the panel.

BRIEF DESCRIPTION OF THE DRAWINGS

FIG. 5 is a cross-sectional view of the shelving arrangement of FIG. 1 in a position between a collapsed position and the expanded position.

FIG. 6 is a front elevation view of the shelving arrangement of FIG. 1 in the collapsed position.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
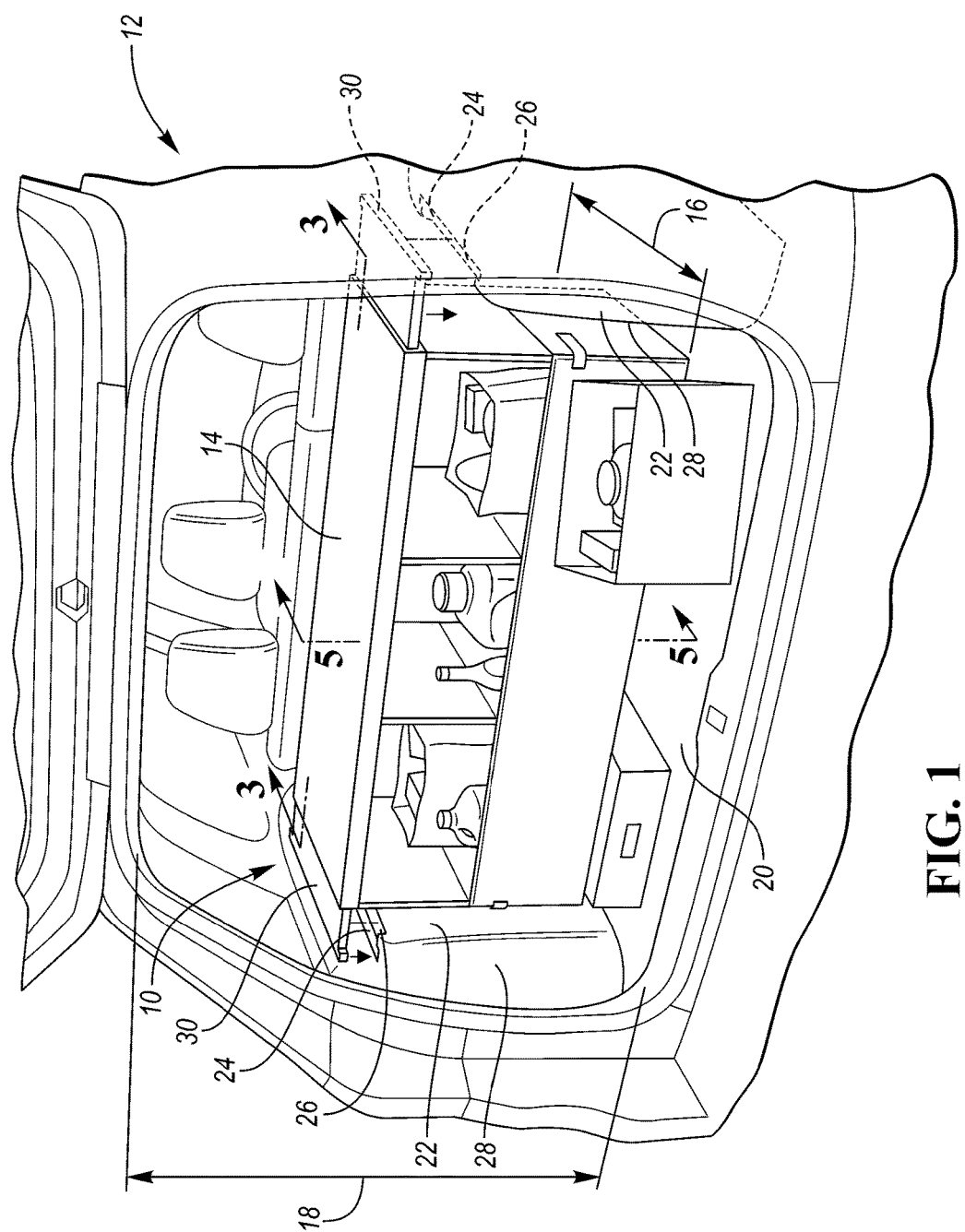
FIG. 1 is a fragmentary perspective view of a cargo area of a vehicle with a shelving arrangement in an expanded position in accordance with an embodiment of the instant disclosure.

FIG. 1 is a fragmentary perspective view of a cargo area 10 of a vehicle 12 with a shelving arrangement 14 in an expanded position. The cargo area 10 may be disposed behind passenger seats to store items in the vehicle 12. In the illustrated embodiment, the vehicle 12 is a three-row SUV. In other embodiments, however, the vehicle 12 may be another type of motor vehicle. In the illustrated embodiment, the cargo area 10 has a depth 16 less than a height 18 thereof. It may be desirable to include a shelving arrangement 14 that allows items to be stored therein, leaving room on a floor 20 of the cargo area 10 for storing additional items. The cargo area 10 may be defined by opposing interior sidewalls 22 (e.g., left and right interior sidewalls). The sidewalls 22 may each have a mount 24 coupled thereto for supporting the arrangement 14 in the expanded position. The mounts 24 may be formed in the respective sidewall 22 in some embodiments. In the illustrated embodiment, each of the mounts 24 is defined by a recess 26 formed within a top surface of the respective sidewall. In other embodiments, the mount 24 may be a ledge protruding away from a base surface 28 of the respective sidewall 22. One of ordinary skill in the art will understand that the mounts 24 may take on a variety of different configurations within the spirit and scope of the instant disclosure. For example and without limitation, the mounts 24 may be L-shaped brackets or U-shaped brackets in which each bracket defines a cavity for receiving a respective handle 30. The handles 30 and mounts 24 may be arranged to engage with each other such that the shelving arrangement 14 is selectively mounted or coupled to the sidewalls 22. In addition, although the shelving arrangement 14 is illustrated as being positioned in the rear of the vehicle 12, the arrangement 14 may be positioned elsewhere within the vehicle 12 in accordance with other embodiments.

Figure 2:
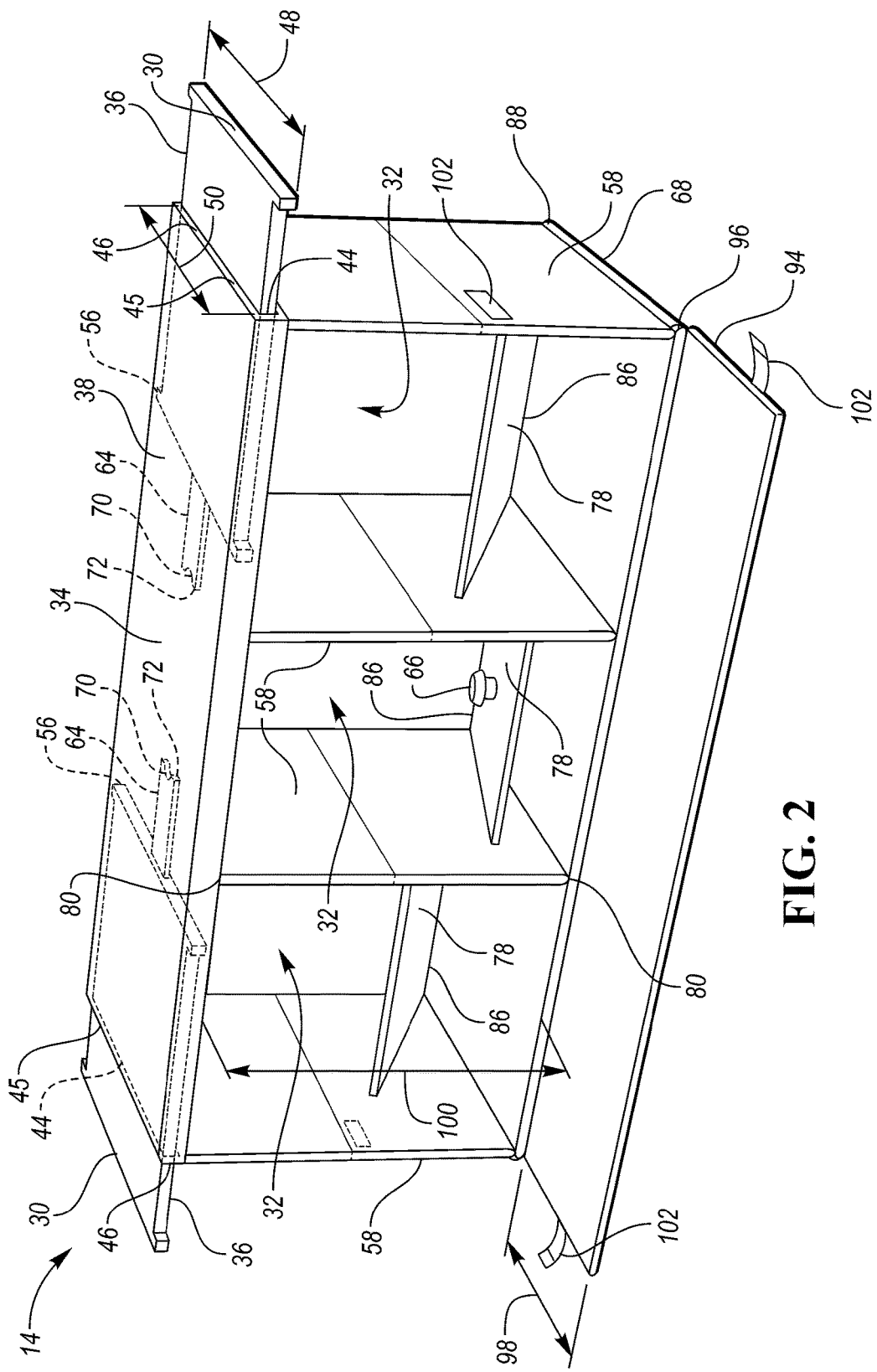
FIG. 2 is a perspective view of the shelving arrangement illustrated in FIG. 1.
Figure 3:
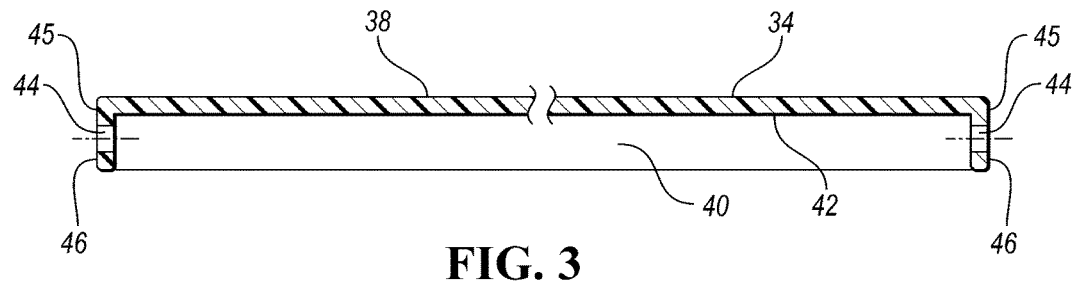
FIG. 3 is a cross-sectional view of a top panel of the shelving arrangement of FIG. 1.

FIG. 2 is a perspective view of the shelving arrangement 14 illustrated in FIG. 1 upon moving from the expanded position to the collapsed position. The arrangement 14 may define storage receptacles 32 and include a rigid top panel 34 with extendable wings 36 configured to engage the mounts 24 to support and suspend the arrangement 14 within the cargo area 10. In one embodiment, a main portion 38 of the top panel 34 may serve as a base from which the other elements expand when suspended within the vehicle 12. The main portion 38 of the top panel 34 may be hollow to define a cavity 40 (FIG. 3) or hollowed portion (hereinafter simply referred to as "cavity") for receiving and housing the wings 36 in a collapsed position. In the illustrated embodiment, the cavity 40 is formed in an underside 42 of the main portion 38 of the top panel 34, as shown in FIG. 3 which is a cross-sectional view of the top panel 34 of the arrangement 14 of FIG. 1. In other embodiments, the cavity 40 has two portions with each portion extending from the respective opening 44 inward toward the other portion such that the two portions are separate cavities. In the illustrated embodiment, the main portion 38 of the top panel 34 has opposing ends 45 with opposite side surfaces 46. Each of the side surfaces 46 defines the respective opening 44 to the cavity 40 for receiving the respective wing 36. In one embodiment, the top panel 34 is injection molded and comprises plastic.

With reference to FIG. 2, the wings 36 may be slidably coupled to opposing ends 45 of the main portion 38 of the top panel 34 for engaging with the opposing interior sidewalls 22 (FIG. 1) of the vehicle 12. Each of the wings 36 may be slidable between the expanded position and the collapsed position in which the wing 36 is disposed within the cavity 40 (FIG. 3) defined by the panel 34. The wings 36 may be disposed between side surfaces 46 of the top panel 34 when in the collapsed position. In the illustrated embodiment, the wings 36 are identical in size and shape. One of ordinary skill in the art will understand that the wings 36 may be dissimilar in size and shape in other embodiments. Furthermore, the arrangement 14 may be configured to have one wing 36 extendable from one opposing end 45 of the panel 34. In such a configuration, the end 45 of the panel 34 opposite the extendable wing 36 may be a non-extendable wing that is configured to engage with the respective mount 24 (FIG. 1).

With continued reference to FIG. 2, the arrangement may further comprise handles 30 coupled to the wings 36 and that protrude from the respective opening 44 in the collapsed and expanded positions to be accessible to the user. The handles 30 may also serve as stops to limit movement of the respective wing 36 in an inward direction upon moving from the expanded position to the collapsed position. In one embodiment, each of the handles 30 may have a length 48 greater than a length 50 of the respective opening 44. In another embodiment, each of the handles 30 may have a width greater than a width of the respective opening 44 in lieu of or in addition to having a length 48 greater than the length 50 of the respective opening 44 (the widths being the dimension perpendicular to the respective length 48, 50). One of ordinary skill in the art will understand that there are various ways to configure the handles 30 and openings 44 such that the handles 30 act as stops for the respective wing 36. Furthermore, the stops may be incorporated elsewhere, such as on the wings 36 and/or within the main portion 38 of the top panel 34 in accordance with other embodiments. Opposite the respective handle 30, each of the wings 36 may have another stop 56 to limit movement of the respective wing 36 in an outward direction upon moving from the collapsed position to the expanded position. In the illustrated embodiment, the stops 56 are similarly sized and shaped as the handles 30. As described above, however, one of ordinary skill in the art will understand that the stops 56 may be incorporated elsewhere, such as on the wings 36 and/or within the main portion 38 of the top panel 34 in accordance with other embodiments. In the illustrated embodiment, each of the wings 36 slides through the respective opening 44 between the collapsed and expanded positions.

One of ordinary skill in the art will understand that the handles 30 may be shaped differently in other embodiments. For example and without limitation, the handles 30 may extend downward from the respective wing 36 such that the handle 30 together with the respective wing 36 form an "L." In another embodiment, the wings 36 may have one or multiple cavity(ies) extending through the wing 36 to receive and engage with a corresponding peg(s) protruding from the respective sidewall 22.

Figure 4:
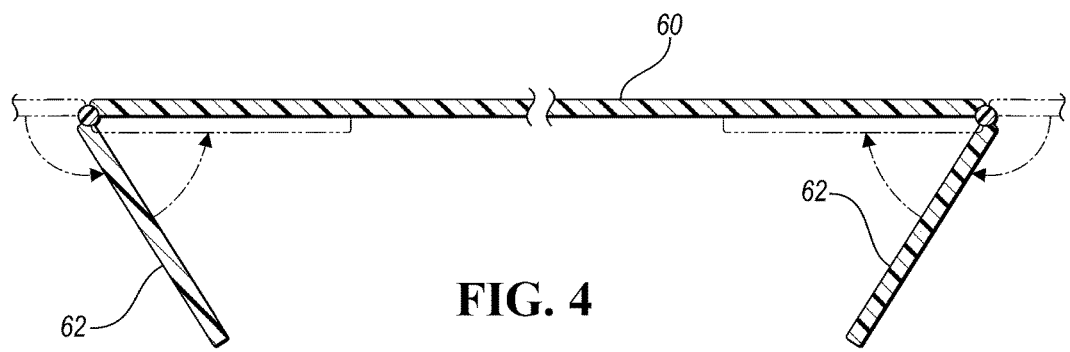
FIG. 4 is a cross-sectional view of a top panel and wings of a shelving arrangement in accordance with another embodiment of the instant disclosure.

Although the illustrated embodiment depicts the wings 36 as being slidable between the collapsed and expanded positions, the wings 36 may be hinged at the respective opposing end 45 of the top panel 34 such that in the collapsed position, the wings 36 are disposed underneath the top panel 34 and contain collapsible walls 58 of the arrangement 14 therein. An example of such a configuration is illustrated in FIG. 4, which is a cross-sectional view of a top panel 60 and pivotable wings 62 in accordance with another embodiment.

As shown in FIG. 2, at least one of wings 36 may further include a latch member 64 configured to latch with a latch member 66 coupled to a bottom panel 68 of the arrangement 14 in the collapsed position, such that upon sliding the wings 36 away from the opposing ends 45 of the top panel 34 to the expanded position, the latch members 64, 66 unlatch to allow the collapsible walls 58 and bottom panel 68 to move to the expanded position. In the illustrated embodiment, each of the latch members 64 is coupled to the end of the respective wing 36 opposite the handle 30 such that movement of the handle 30 causes movement of the latch member 64. Each of the latch members 64 may be in the form of a bar having a slot 70 at an end of the bar opposite the respective wing 36. Each of the slots 70 may be formed in an edge surface 72 of the respective latch member 64. The slots 70 may be shaped to accommodate the shape of the latch member 66 coupled to the bottom panel 68. As shown in FIG. 5, which is a cross-sectional view of the arrangement 14 in a position between the collapsed and expanded positions, the latch member 66 coupled to the bottom panel 68 may be mushroom-shaped and protrude upwards to be received by the slots 70 of the latch members 64 in the collapsed position. The slots 70 may be sized to snap-fit over a cylindrical base 74 of the latch member 66, and a cap 76 of the latch member 66 may protrude radially outwardly from the base 74 to secure the latch members 64, 66 in the collapsed position. In the illustrated embodiment, the latch member 66 is coupled to a brace 78 (described in more detail below) that is coupled to the bottom panel 68. One of ordinary skill in the art will understand that the latch members 64, 66 may be disposed in several other places in the arrangement 14 such that moving the wings 36 to the expanded position causes the latch members 64, 66 to unlatch, and moving the wings 36 to the collapsed position causes the latch members 64, 66 to latch. Furthermore, the latch members 64, 66 may take on a variety of configurations to accomplish such latching (or similar latching).

With continued reference to FIG. 2, the arrangement 14 may further include the rigid bottom panel 68 that may retain its size and shape in the expanded and collapsed positions, similar to the main portion 38 of top panel 34. The bottom panel 68 may be spaced apart from the top panel 34 such that the bottom panel 68 is closer to the top panel 34 in the expanded position than in the collapsed position. The bottom panel 68 may be generally rectangular in shape, similar to the main portion 38 of the top panel 34. The bottom panel 68 may define floors of the receptacles 32, and the top panel 34 may define ceilings of the receptacles 32. Opposite ends 80 of the collapsible walls 58 may be hingedly attached to the top and bottom panels 34, 68.

The arrangement 14 may further include collapsible walls 58 defining the storage receptacles 32. By being "collapsible," the walls 58 may fold or collapse in a controlled and intentional manner such that the walls 58 may move repeatedly between the collapsed and expanded positions. In other words, upon being collapsed to the collapsed position, the walls 58 may be uncollapsed and expanded to the expanded position. Upon being collapsed, the walls 58 may be temporarily deformed but can return to the expanded position in which the walls 58 are generally straight and unfolded.

In the expanded position, the walls 58 may serve as lateral sides of the receptacles 32. Each of the walls 58 may be attached with the top panel 34 such that in the expanded position, the storage receptacles 32 are disposed on one side of the top panel 34. In one embodiment, the storage receptacles 32 are disposed underneath the top panel 34 in the expanded position. As illustrated in FIG. 5 and FIG. 6, which is a front elevation view of the arrangement 14 of FIG. 1 in the collapsed position, each of the collapsible walls 58 may be foldable about a fold line 82 between the opposing ends 80 of the respective wall 58 such that two portions 84 of the wall 58 defined by the fold line 82 contact and overlap each other in the collapsed position. In one embodiment, adjacent walls 58 may fold and unfold in opposite directions upon moving between the collapsed and expanded positions, such that the fold lines of adjacent walls 58 move in opposite directions upon moving between the collapsed and expanded positions. Furthermore, the outermost walls 58 of the arrangement 14 may fold in opposite directions such that in the collapsed position, the walls 58 are disposed within the outer perimeters 84 of the top and bottom panels 34, 68.

Also, in the illustrated embodiment, there is one fold line 82 generally disposed midway between opposing ends 80 of the respective wall 58. The fold line 82 may be disposed midway between the top and bottom panels 34, 68. In the illustrated embodiment, the fold line 82 is generally parallel to top and bottom edges of the respective wall 58 that are hingedly attached to the top and bottom panels 34, 68. The fold line 82 may also be generally parallel to the top and bottom panels 34, 68. The fold line 82 may be oriented such that outer perimeters 84 of the top and bottom panels 34, 68 generally align with one another in the collapsed position.

In other embodiments, there may be more than one fold line 82 for each wall 58. For example and without limitation, the walls 58 may be configured similar to an accordion with adjacent fold lines 82 of the respective wall moving in opposite directions upon moving between the collapsed and expanded positions. In the illustrated embodiment, there are four walls 58 defining three receptacles 32. More or less walls 58 may be utilized in other embodiments. The walls 58 may be constructed of compressed wood or paper fibrous material, compressed fiber board, or metal covered with fabric. In some embodiments, the walls 58 may be constructed as two parts joined together with a living hinge. In such embodiments, the walls 58 may comprise plastic or the like.

With reference to FIG. 2, the arrangement 14 may further include braces 78 for stabilizing the arrangement 14 in the expanded position. Each of the braces 78 may have an end 86 hingedly attached to one of the top and bottom panels 34, 68 such that in the expanded position, the braces 78 are positionable between the top and bottom panels 34, 68 to separate and structurally support the top and bottom panels 34, 68. In the illustrated embodiment, the braces 78 are hingedly attached to a rear end 88 of the bottom panel 68. In the collapsed position, each of the braces 78 are oriented parallel to the top and bottom panels 34, 68 and may be disposed between the top panel 34 and collapsible walls 58, or between the collapsible walls 58 and bottom panel 68 as shown in the illustrated embodiment (see FIG. 6). In the expanded position, each of the braces 78 may be moved or pivoted by the user to be disposed perpendicularly to the top and bottom panels 34, 68. Each of the braces 78 may be sized such that the respective brace 78 applies pressure to the top and bottom panels 34, 68 to separate the panels 34, 68 and to expand the respective receptacle 32. When the arrangement 14 is suspended within the vehicle 12, the walls 58 may not unfold completely (i.e., the weight of the bottom panel 68 and respective wall 58, along with the force of gravity, may not be strong enough to unfold the wall 58 such that the wall 58 is straight in the expanded position). As such, the brace 78 may force the respective walls 58 to become taut between the top and bottom panels 34, 68. Each of the braces 78 may have a length 90 (FIG. 5) for spanning between the respective adjacent walls 58. In other embodiments, the braces 78 may have a lesser length 90 than depicted in the illustrated embodiment.

Although in the illustrated embodiment, there are three braces 78, one for each receptacle 32, there may be more or less braces 78 in other embodiments. For example and without limitation, the arrangement 14 may include one brace 78 that spans across all of the receptacles 32 and is disposed underneath the bottom panel 68 in the collapsed position. The braces 78 may also be hingedly connected to the top panel 34 in another embodiment. Although in the illustrated embodiment, the braces 78 are hingedly attached to the rear end 88 of the bottom panel 68, the braces 78 may be hingedly attached elsewhere. For example and without limitation, the braces 78 may be disposed parallel to the walls 58 and be hingedly attached to the bottom panel 68 adjacent the respective wall 58. In the illustrated embodiment, the braces 78 form rear walls of the respective receptacle 32 in the expanded position.

Referring to FIG. 5, each of the receptacles may be lined with a fabric panel 92 at a rear of the respective receptacle 32. Each of the fabric panels 92 may be connected to the top and bottom panels 34, 68 and respective walls 58. In one embodiment, the fabric panels 92 may also be collapsible but not fold in the same manner as the walls 58. In the expanded position, each of the braces 78 may be disposed adjacent the respective fabric panel 92. Although the illustrated embodiment includes three fabric panels 92, there may be more or less fabric panels 92 in other embodiments.

With reference to FIG. 2, the arrangement 14 may further include a retainer flap 94 to prevent items stored within the receptacles 32 from falling out of the receptacles 32 upon operation of the vehicle 12. The retainer flap 94 may be hingedly attached to the bottom panel 68 at a front end 96 of the bottom panel 68 adjacent openings of the receptacles 32. In the illustrated embodiment, the retainer flap 94 spans across all of the receptacles 32 and across the length of the bottom panel 68. In other embodiments, there may be separate retainer flaps 94 for each receptacle 32 that are moveable independently of one another. In the illustrated embodiment, the retainer flap 94 has a height 98 less than a height 100 of the receptacles 32. The retainer flap 94 may be removably attached to at least one of the walls 58. In the illustrated embodiment, the retainer flap 94 is removably attached to the outermost walls 58 of the arrangement 14. The retainer flap 94 may be removably attached to the walls 58 via fasteners 102, which may be Velcro. In other embodiments, magnets may be used as fasteners 102. One of ordinary skill in the art will understand that there are several ways to removably attach and secure the retainer flap 94 in the expanded position such that the retainer flap 94 is disposed generally perpendicularly to the walls 58 and to the bottom panel 68 in the expanded position. In another embodiment, the retainer flap 94 may be removably attached to the top panel 34. In the collapsed position, the retainer flap 94 may fold and be disposed underneath the bottom panel 68 opposite the collapsible walls 58 and braces 78 (see FIG. 6).

Although the arrangement 14 is illustrated as having one row of receptacles 32, the arrangement 14 may have more than one row of receptacles 32 in other embodiments. In such embodiments, the arrangement 14 may include an additional rigid panel, similar to the bottom panel 68, disposed between the top and bottom panels 34, 68. Furthermore, the receptacles 32 may have different shapes and sizes.

Figure 7:
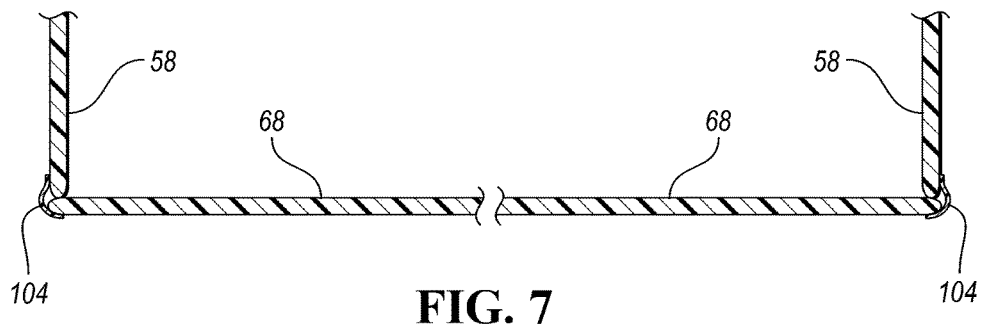
FIG. 7 is a close-up cross-sectional view of the shelving arrangement of FIG. 1.

One of ordinary skill in the art that there are numerous ways to hingedly attach elements. FIG. 7 is a close-up cross-sectional view of a wall 58 and bottom panel 68 of the arrangement 14 of FIG. 1 in the expanded position, and illustrates an example of how the various members of the arrangement 14 may be hingedly attached to one another. In the illustrated embodiment, the collapsible walls 58 may be hingedly attached to the top and bottom panels 34, 68 by a joint member 104 that joins the respective wall 58 and panel 34, 68 and is relatively flexible to permit the wall 58 to move relative to the respective panel 34, 68. In one embodiment, the joint member 104 comprises plastic and may be thinner than the walls 58 and panels 34, 68. In some embodiments, the joint member 104 may comprise a different material than that of the walls 58. Furthermore, the joint member 104 may have holes throughout to increase flexibility thereof. Ends of the walls 58 that connect with the top and bottom panels 34, 68 may be spaced from the respective panel 34, 68 sufficiently to allow collapsing of the walls 58 relative to the panel 34, 68.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Furthermore, details disclosed in connection with one embodiment apply to other disclosed embodiments as well, unless specified otherwise.

What is claimed is:

1. A vehicle comprising:
    a cargo area defined by interior sidewalls each defining a mount; and
    a shelving arrangement defining a storage receptacle, including
        a rigid top panel with extendable wings configured to engage the mounts to support and suspend the arrangement within the cargo area,
        a bottom panel; and
        collapsible walls attached with the top panel and the bottom panel such that in an expanded position, the storage receptacle is disposed underneath the panel.

2. The vehicle of claim 1, wherein each of the mounts defines a recess formed in the respective sidewall for receiving the respective wing.

3. The vehicle of claim 1, wherein each of the extendable wings is slidable between the expanded position and a collapsed position in which the extendable wing is disposed within a cavity defined by the top panel.

4. The vehicle of claim 1, wherein the top panel has opposite side surfaces, and wherein the extendable wings are disposed between the side surfaces when in a collapsed position.

5. The vehicle of claim 1, wherein the bottom panel is rigid.

6. The vehicle of claim 5, further comprising a brace having a first end hingedly attached to one of the top and bottom panels such that in the expanded position, the brace is positionable between the top and bottom panels to separate and structurally support the top and bottom panels.

7. The vehicle of claim 6, wherein the brace has a length for spanning between adjacent collapsible walls.

8. The vehicle of claim 5, further comprising a retainer flap hingedly attached to the rigid bottom panel at a front end of the bottom panel adjacent an opening to the storage receptacle, and removably attached to at least one of the collapsible walls.

9. A shelving arrangement for a vehicle, comprising:
    a rigid top panel having wings configured to engage with mounts coupled to opposing interior walls of a cargo area of the vehicle to support the panel within the cargo area;
    a rigid bottom panel; and
    collapsible walls attached with the top panel and the bottom panel such that in an expanded position, the collapsible walls define a storage receptacle disposed on one side of the top panel.

10. The shelving arrangement of claim 9, wherein at least one of the wings is slidable between the expanded position and a collapsed position in which the extendable wing is disposed within a cavity defined by the top panel.

11. The shelving arrangement of claim 9, wherein the top panel has opposite side surfaces, and wherein the wings are extendable and disposed between the side surfaces when in a collapsed position.

12. The shelving arrangement of claim 9, further comprising a brace having a first end hingedly attached to either the rigid top panel or the bottom panel such that in the expanded position, the brace is positionable between the top and bottom panels to separate and structurally support the top and bottom panels.

13. The shelving arrangement of claim 12, wherein the brace has a length for spanning between adjacent collapsible walls.

14. A shelving arrangement for a vehicle, comprising:
    a rigid top panel having a hollowed portion formed in an underside thereof for receiving extendable wings in a collapsed position, the wings being slidably coupled to opposing ends of the panel for engaging with opposing interior sidewalls of the vehicle;
    a bottom panel; and
    collapsible walls attached with the top panel and the bottom panel such that in an expanded position, a storage receptacle defined by the walls is disposed underneath the panel.

15. The shelving arrangement of claim 14, wherein each of the opposing ends of the top panel defines an opening to the hollowed portion for receiving the respective wing.

16. The shelving arrangement of claim 15, further comprising handles coupled to the wings and that protrude from the respective openings in the collapsed and expanded positions.

17. The shelving arrangement of claim 14, wherein opposite ends of the collapsible walls are hingedly attached to the top and bottom panels.

18. The shelving arrangement of claim 17, wherein at least one of the wings has a first latch member configured to latch with a second latch member coupled to the bottom panel in the collapsed position, such that upon sliding the wings away from opposing ends of the top panel to the expanded position, the first and second latch members unlatch to allow the collapsible walls and bottom panel to move to the expanded position.

19. The shelving arrangement of claim 14, wherein each of the collapsible walls is foldable about a fold line between the opposing ends of the respective wall such that two portions of the wall defined by the fold line contact and overlap each other in the collapsed position.

20. The shelving arrangement of claim 9, further comprising:
   a first latch member coupled to the rigid top panel;
   a second latch member coupled to the rigid bottom panel, wherein the first latch member is configured to engage the second latch member when the collapsible walls are in a collapsed position and disengage the second latch member when the collapsible walls are in the expanded position.

* * * * *